Patented May 3, 1932

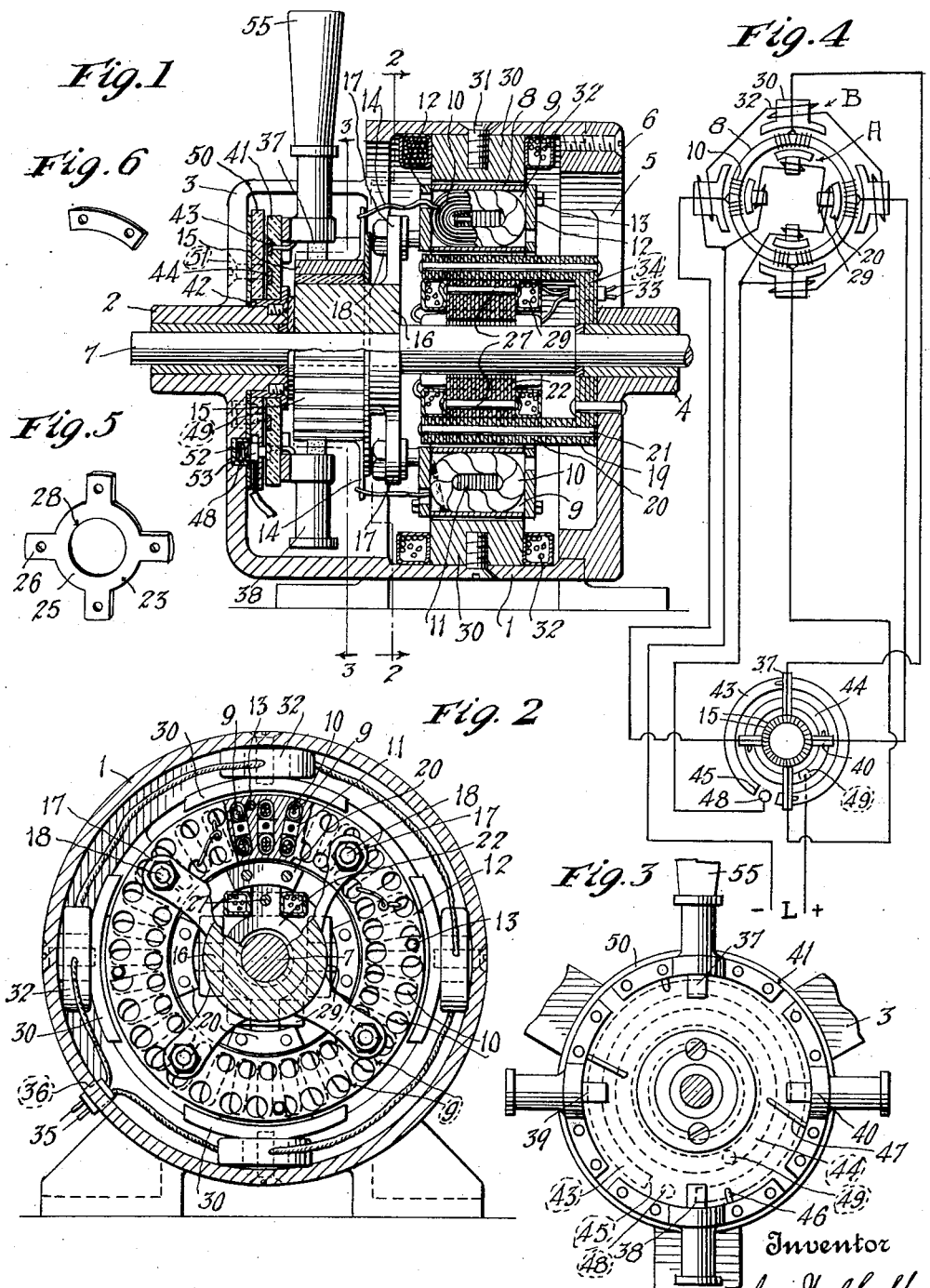

1,856,146

UNITED STATES PATENT OFFICE

JOHN WOLKOFF, OF NEWARK, NEW JERSEY

DYNAMO ELECTRIC MACHINE

Application filed April 10, 1930. Serial No. 443,036.

This invention relates in general to electric motors, and more particularly to a motor the direction of rotation of the armature of which can be reversed and the speed of rotation in either direction controlled or varied by a simple movement of the brushes. In general the invention relates to the motor described in my Patent No. 1,594,398 dated August 3, 1926.

One object of the present invention is to provide an electric motor of the general character described embodying novel and improved construction and arrangement of the field magnets and windings, whereby a motor of high power relative to the size thereof can be obtained.

Another object is to provide in an electric motor, a ring-like or annular armature and the field divided into two sections, one section being disposed within the armature coaxially therewith and the other section surrounding the armature in concentric relation thereto, the two sections of the field being capable of connection in either series or parallel or each used independently of the other whereby the power and speed of the motor may be varied by proper connections of the field in the circuit.

A further object is to provide a novel and improved brush mounting whereby the brushes may be rotated about the commutator, in combination with novel and improved switch means for disconnecting the motor from the line when the brushes are in neutral position.

Other objects are to provide a novel and improved armature construction for electric motors; to provide a novel and improved construction of field poles, and to obtain other advantages and results as will be more fully brought out by the following description.

Referring to the accompanying drawings in which corresponding and like parts are designated throughout the views by the same reference characters, Figure 1 is a longitudinal vertical sectional view through an electric motor embodying my invention, portions being shown in side elevation for clearness in illustration.

Figure 2 is a transverse vertical sectional view on the line 2—2 of Figure 1.

Figure 3 is an elevation of the brush mounting taken on the line 3—3 of Figure 1.

Figure 4 is a wiring diagram of the motor and its connections.

Figure 5 is a detached perspective view of one of the laminations forming a part of the field poles for the inner section of the field, and Figure 6 is a similar view of another lamination forming a part of one of the field poles of the inner section of the field.

Specifically describing the illustrated embodiment of the invention, the reference character 1 designates the frame of the motor which is of the usual construction and provided at one end with a bearing 2 supported by a spider integral with the frame, and at the other end with a bearing 4 in a spider 5 separable from the frame as by screws 6 in the usual way. Within the frame and journaled in the bearings 4 is a shaft 7 upon which is mounted the armature comprising an annular or ring-like body section 8, either solid or formed of laminations of magnetic metal, and having a plurality of openings 9 extending longitudinally through the body portion and equidistantly spaced circumferentially thereof and arranged substantially radially with respect to the axis of the body portion. Within each of the openings 9 is arranged a winding or coil 10 about a core piece 11, preferably laminated, said coils or windings being insulated from the body portion in the usual way and being held against movement out of the openings by end plates 12 secured to the respective ends of the body 8 as by bolts or screws 13. These end plates are preferably perforated or spider-like in form so as to permit ventilation of the coils 10. The coils 10 are connected in series as usual with one terminal of each coil connected to the opposite terminal of the next adjacent coil and through a conductor 14 to one bar of the commutator which consists of the usual annularly arranged and insulated bars 15. The commutator is concentric with the shaft 7 and is shown as mounted on a sleeve 16 having radial arms 17 which are connected by bolts 18 to one of the end plates 12, whereby the armature body 8 is mounted on the shaft 7. Obviously the sleeve 16 must be fast on the shaft so that the shaft will rotate with the armature.

The field of the motor includes an inner section A mounted on the end spider 5 and disposed coaxially with the armature 8 at the inside thereof, and an outer section B which is secured to the frame 1 at the outside of the armature and concentric therewith. The inner section A consists of a cup-shaped base 19 preferably formed of laminations of metal and secured as by riveting to the inside of the end spider 5. At the edge of the cup-shaped portion 9 are a plurality of pole shoes 20 also formed of laminations and arcuate concentrically with the shaft, as shown in Figures 2 and 6 of the drawings. The laminations of the pole shoes 20 may be secured to the base portion 19 by rivets or the like 21. Supported within the pole shoes and in snug frictional but separable contact therewith, is a core section 22 formed of substantially cross shaped laminations 23 each having a field ring portion 25 and radial arms 26. The laminations are secured together by rivets 27. This core section has a central opening 28 to loosely receive the shaft 7 of the motor, and when in operation the core section is slipped within the pole shoes 20 with one of the arms 26 frictionally but separably engaging each of the pole shoes. Around each of the arms of the core section is a winding or coil 29. As shown on the drawings, there are four pole shoes arranged in two pairs which are disposed at substantially right angles to each other, diametrically opposite pole shoes being similar and complemental, that is, north or south poles. The coils 29 are connected in series with each other.

The outer field section includes four poles 30 arranged in two pairs, one pole of each pair being arranged directly opposite or in juxtapoistion with the corresponding pole of the inner field section; that is, each north pole of the outer field section is arranged at the opposite side of the armature from one north pole of the inner field section. These poles 30 are secured to the frame of the motor as by screws 31. Around each of the poles 30 is a winding 32, and these windings are connected in series with each other. Where the motor is to be operated on low voltage current, the field sections may be connected in parallel with each other, but with higher voltages, for example, 220 volts, the field sections should be connected in series.

The leads 33 from the field section windings may pass outwardly through an opening 34 in the base section 19, while the leads 35 from the outer field windings may pass through an opening 36 in the frame of the motor.

The motor is provided with four brushes 37, 38, 39 and 40, adjacent brushes being arranged at substantially right angles to each other, and the diametrically opposite brushes being connected to the same side of the circuit. These brushes are mounted upon a disc 41 of insulation rotatable upon a bushing 42 secured to the bearing 2 of the motor, and the disc is arranged to rotate so that the brushes may be rotated about the commutator.

At the side of the disc 41 opposite the brushes are two conducting bars 43 and 44 concentric with each other and the disc. The outer bar 43 is split at 45, while the inner bar 44 is continuous. Two of the brushes, in the present instance the brushes 37 and 38, are electrically connected as by wires 46 to the bar 43, while the other brushes are connected as by wires 47 to the other bar 44.

While the outer bar 43 cooperates a spring contact stud 48 mounted in the end spider and electrically connected to one terminal of the field sections which are shown in Figure 4 as connected in parallel. A similar spring stud 49 cooperates with the other conducting bar 44 and is connected to the positive side of the electrical supply line L. The other terminals of the field sections are directly connected to the negative side of the supply line L. As shown in Figure 4 of the drawings the armature windings are connected to the respective commutator bars.

Preferably the spring contact studs 48 and 49 are mounted in a second disc 50 of insulation secured against movement upon the end spider 3 as by screws 51. Obviously the contact studs and the springs 52 are insulated from the frame of the motor as by cups 53 formed of insulating material in which the springs are mounted and the studs are slidable.

One of the brushes, preferably the upper one is provided with a handle 55 for rotating the brush supporting disc 41.

It will be observed that the coils or windings of the field sections are in series through the brushes with the armature.

The operation of the motor will be understood from the foregoing but it may be generally described as follows. With the disc 41 located as shown in Figures 1 and 3 of the drawings, the contact stud 48 is located between the ends of the contact bar 43 and out of electrical contact with the bar so as to break the circuit through the motor. This construction thus serves as a switch. Upon rotation of the disc in one direction, the circuit is closed by contact of the stud 48 with the bar 43 and the armature starts to rotate in one direction. Upon further movement of the disc 41 and the brushes in the same direction, the speed of the motor increases. Assuming the brushes to be in the neutral position shown in Figure 3, when the brushes are rotated in the other direction, the armature is rotated in the direction opposite to that first described, and further rotation of the brushes in the same direction causes an increase in the speed of the armature. Therefore, both the direction of rotation of the armature and the speed thereof are controlled by simple movement of the brushes, and furthermore when the brushes are in neutral position the circuit is automatically broken by disengagement of the bar 43 from the contact stud 48.

As hereinbefore described the field sections A and B may be connected in series instead of in parallel as shown in Figure 4 of the drawings, or either one of the field sections may be thrown out of circuit, as may be desired. Such changes of course affect the power and speed of the motor.

It will also be understood by those skilled in the art that the motor is adapted for use with either alternating current or direct current.

While I have shown and described the motor as embodying certain details of construction it should be understood that this is primarily for the purpose of illustrating the principles of the invention, and that many modifications and changes may be made in the details of construction without departing from the spirit or scope of the invention.

Having thus described my invention, what I claim is:

1. An electric motor comprising a frame, a shaft journaled therein, an annular armature including windings mounted on said shaft, and a field member comprising a body mounted on said frame and having field poles coaxially arranged within said armature, said field poles comprising a central section loosely surrounding said shaft and having radial arms one for each pole, and each pole having a shoe secured to said body and frictionally engaging one of the arms of the central section so that said central section is removably supported by said shoes, and a winding surrounding each of said arms.

2. A dynamo-electric machine comprising an armature including an annular body and one series of windings thereon, a commutator having each bar connected to one terminal of one armature winding and to the opposite terminal of an adjacent armature winding, whereby corresponding inner and outer portions of the armature body have the same magnetic polarity, brushes cooperating with said commutator, and opposed field poles and windings each composed of two juxtaposed sections, one section within the armature and the other section outside the armature, at least one section of one pole and the corresponding section of the other pole being laminated.

3. A dynamo-electric machine comprising an armature including an annular body and one series of windings thereon, a commutator having each bar connected to one terminal of one armature winding and to the opposite terminal of an adjacent armature winding, whereby corresponding inner and outer portions of the armature body have the same magnetic polarity, brushes cooperating with said commutator, and two pairs of field poles and windings arranged at right angles to each other with one pole of each pair complemental to the other and each pole comprising two juxtaposed sections, one section within the armature and the other section outside the armature, at least one section of one pole and the corresponding sections of the other poles being laminated.

4. The dynamo-electric machine set forth in claim 2 with the addition of means connecting one terminal of said field windings to one of said brushes and the other terminal to a supply line and for connecting the other brush to the other terminal of said supply line.

5. The dynamo-electric machine set forth in claim 2 wherein said inner and outer field windings are arranged to be connected in parallel or series.

6. The dynamo-electric machine set forth in claim 2 wherein said laminated sections of the field poles are integrally connected by a field ring.

7. The dynamo-electric machine set forth in claim 2 wherein said armature body has circumferentially spaced longitudinal recesses, and said armature windings are arranged in said recesses with their axes transverse thereto.

JOHN WOLKOFF.